J. D. ROOTS.
FLUID PRESSURE ENGINE.
APPLICATION FILED JUNE 29, 1910.

1,125,722.

Patented Jan. 19, 1915.
3 SHEETS—SHEET 1.

Witnesses.

Inventor
James Dennis Roots

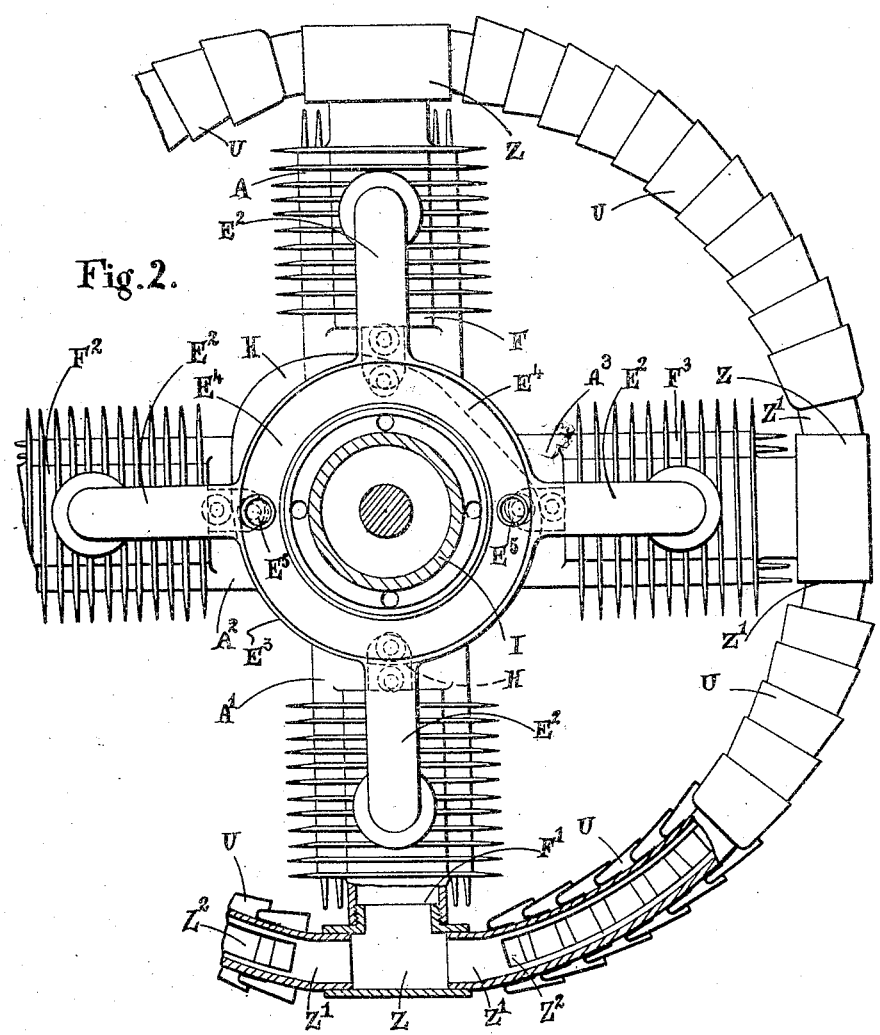

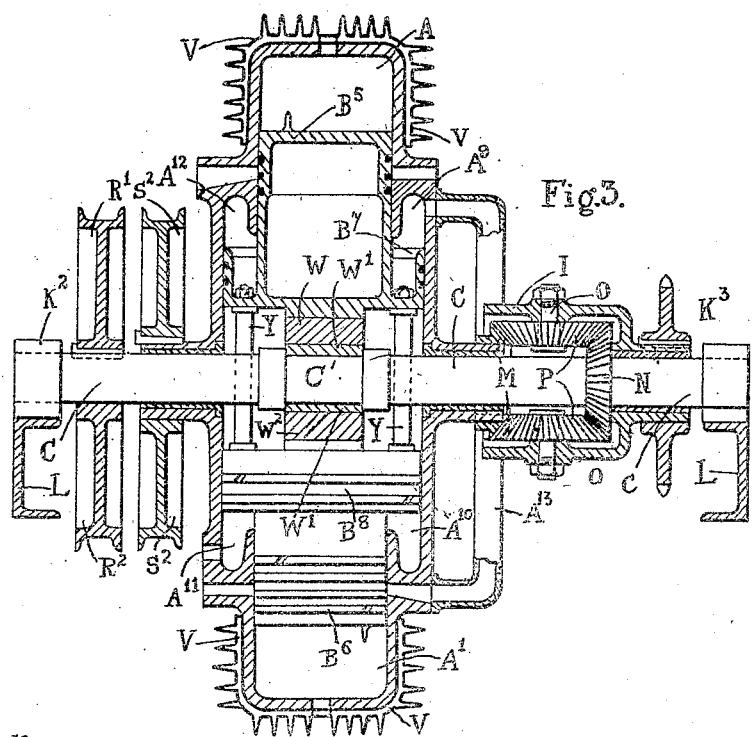
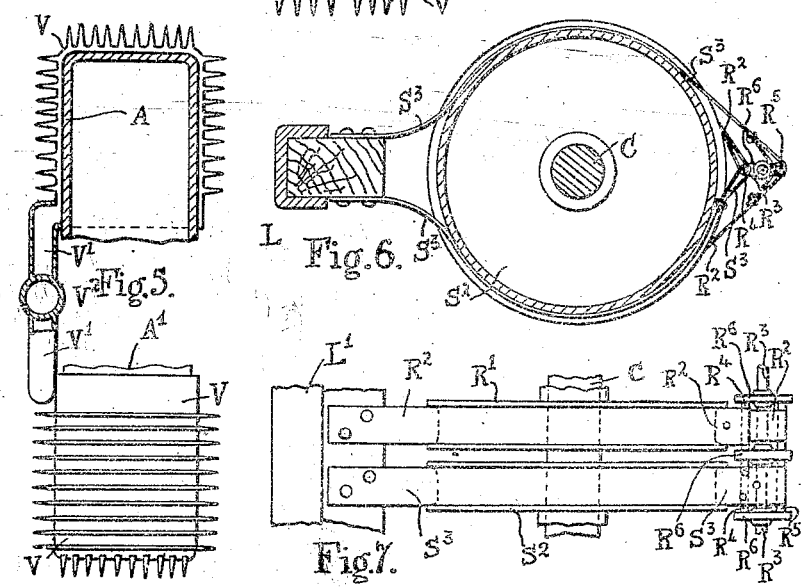

UNITED STATES PATENT OFFICE.

JAMES DENNIS ROOTS, OF LONDON, ENGLAND.

FLUID-PRESSURE ENGINE.

1,125,722.   Specification of Letters Patent.   Patented Jan. 19, 1915.

Application filed June 29, 1910. Serial No. 569,544.

*To all whom it may concern:*

Be it known that I, JAMES DENNIS ROOTS, a subject of the King of Great Britain, and a resident of 58 Avonmore road, West Kensington, London, W. England, have invented new and useful Improvements in or Connected with Fluid - Pressure Engines, of which the following is the specification.

This invention relates to a construction of rotary fluid pressure engine which has many advantages in use.

The construction is particularly adapted for propelling vehicles or the like, or for any purpose in which it is desirable that the engine shall give a variable speed to the driven shafting or the like. It enables the engine drive in either direction at any variation of speed between zero and maximum.

Although the engine may be adapted for different kinds of fluid pressure and applied to different purposes, I will proceed to describe it as constructed for driving by means of explosion gases and as employed for propelling vehicles.

My invention constitutes variable speed engines wherein any variation of speed from zero to a maximum may be provided in a forward or reverse motion of the engine.

An object of my invention is to provide a gas engine, wherein on the forward speed of the engine, the cylinders only, rotate, for reverse maximum speed, the crank only rotates and for intermediate speed the crank is rotated in one direction and the cylinders are rotated in an opposite direction.

Figure 1:
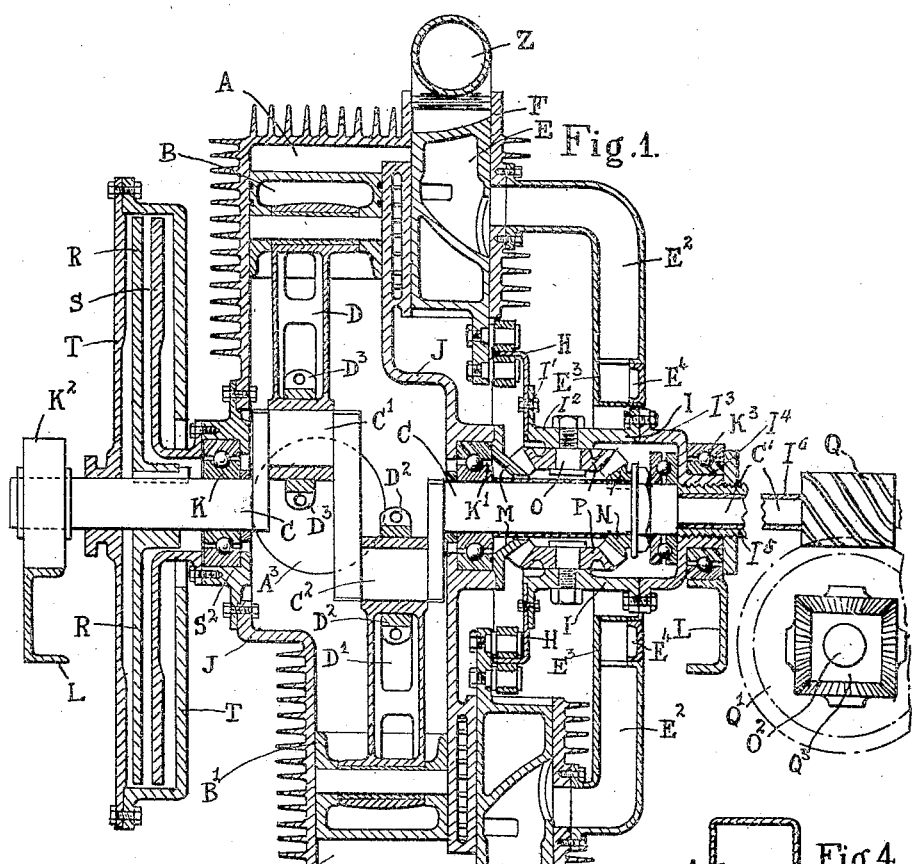
Figure 4:
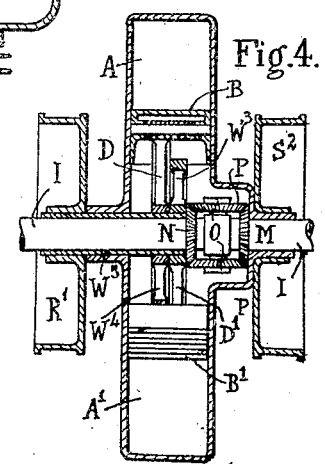

Figure 1 is a sectional elevation of a four stroke cycle internal combustion engine constructed according to this invention. Fig. 2 is an end elevation (part section) of Fig. 1. Fig. 3 is a sectional elevation of another example in which brake pulleys are employed instead of frictional disks and the power may be transmitted from the power sleeve to a shaft parallel with it. Fig. 4 is a diagrammatic section showing the epicyclic or planetary bevel gear inside the main casing. Fig. 5 shows a more complete view of the water cooling or circulating webs than those shown in Fig. 3. Figs. 6 and 7 are an elevation and plan respectively of the band brake or clutch as employed with the band pulleys shown in Fig. 3.

Referring to Figs. 1 and 2, A $A^1$ $A^2$ $A^3$, are the cylinders of the engine, each of which is provided with pistons as shown at B $B^1$ in Fig. 1. These are connected to the crank pins $C^1$ $C^2$ of the shaft C. The connecting rods of the pistons in the cylinders A and $A^3$ are connected to the crank pin $C^1$, and the connecting rods of the pistons in the cylinders $A^1$ and $A^2$ are joined to the crank pin $C^2$.

D is the connecting rod of the piston B in the cylinder A, the big end of this rod fits directly on the crank pin C, while the big end $D^3$ belonging to the cylinder $A^3$, surrounds and embraces the big end of the rod of the cylinder A. The other two big ends are fitted respectively to the crank pin $C^2$ in a similar manner.

The valves shown in this embodiment of my invention are of the piston type, but any suitable form of valve may be employed. Two of the valves E $E^1$ are shown in section in Fig. 1. These are reciprocated in the valve cylinders F $F^1$ $F^2$ $F^3$ by the cam H.

In Figs. 1 and 2, the opposite piston valves E $E^1$ are preferably operated directly as shown by the cam H. The cam H is mounted upon and secured to a flange $I^1$ carried by the power shaft or sleeve I. The two piston valves at right angles to those shown in Fig. 1, those in the valve cylinders $F^2$ $F^3$, do not show in Figs. 1 and 2. The valves may be operated in any suitable manner but it will be observed that in Figs. 1 and 2 which show a four stroke cycle internal combustion engine, the valve gear is mounted upon the power sleeve I which may rotate at a different speed to that of either the cylinder element or the crank or like shaft element.

The central cylinder casing J is mounted on ball bearings K $K^1$ on the shaft C, and the latter is conveniently mounted on the bearings $K^2$ $K^3$ supported on the frame channels L L of the vehicle. The central casing J of the cylinders A $A^1$ $A^2$ $A^3$ has secured thereto the bevel gear wheel M, which therefore rotates with the cylinders. The bevel gear wheel N is keyed to the crank shaft C.

The sleeve I comprises two sections $I^2$ and $I^3$ rotatably mounted on the reduced portion $C^1$ of the shaft C in a manner hereinafter described. The section $I^2$, which is of uniform diameter, surrounds the shaft C and is spaced therefrom, and said section $I^2$, at its outer end, is secured to the inner end of the section $I^3$. As illustrated, the outer end of section $I^3$ is reduced at $I^4$ and secured to a collar $I^5$, which is fastened to a tubular shaft $I^6$ journaled on the reduced portion $C^1$ of the shaft C. As shown, oppositely-disposed, radial pins O are rigidly secured to the inside of the section I and on the pins are pivotally mounted bevel wheels P. The bevel wheels P are of the same size as the bevels N and M, and are continually in engagement with them. There may be two or more planetary or epicyclic gear wheels P.

Secured on the outer end of the tubular shaft $I^6$ is a worm Q, which meshes with a worm $Q^1$, indicated in broken lines, which can coöperate with any suitable gearing and transmission means, as indicated at $Q^2$, $Q^3$, for furnishing power.

The shaft C on the other side of the cylinders has keyed to it the disk R. The disk S is rigidly secured to the cylinders by means of the flanged, annular boss $S^2$ which also serves to carry the outer ring of the ball bearing K.

Mounted loosely upon the shaft C is the drum or casing T inclosing the disks R S. The inner and opposite surfaces of the casing T are adapted to frictionally engage with the surface of either of the disks R, S. The casing T is held from rotation, but is adapted to be moved longitudinally or axially on the shaft C, so as to engage either of the disks R, S.

The explosive mixture is fed to the cylinders by means of the radial pipes $E^2$ which are connected to the annular distributing chamber $E^3$. Part of the annular chamber $E^3$ is fixed to, and rotates with the radial pipes $E^2$, while the outer or cover ring $E^4$ is stationary, and is connected to and held by the pipes $E^5$ (shown only in Fig. 2) leading from the carbureter or like supply. Or the petrol jets or nozzles may be fitted in choke tubes fitted at $E^5$, the jets being fed from a stationary float feed chamber of the usual kind. The mixture passes into each cylinder controlled by the valves before mentioned. Any other suitable kind of valve may be employed.

Each exhaust valve cylinder outlet has screwed therein the T Z. Each end of each T has screwed therein the curved length of pipe $Z^1$. The pipes $Z^1$ are employed as a vehicle or carrier for the U-section rings U, which are secured thereto. The pipes $Z^1$ are cut longitudinally forming slots $Z^2$ of which there may be two, three or any convenient number. Each ring U fits closely over the tube $Z^1$ and is suitably secured thereto. Each ring fits closely next to the ring following and leaves only a small annular outlet for the exhaust gases which are thus divided up and presented to the outer air at the edge of each ring while the rings rapidly rotate, so causing the exhaust to be practically silent. The inner channel or passage way for the exhaust is continuous inside around the circle of exhaust cooling rings U partly shown. The rapid rotation of the rings not only serves to cool the exhaust gases coming in contact with them, but also by rotation to assist in the dispersal or removal of the gases by suction injection or ejection. The exhaust pipe $Z^1$ and its double U-section rings are shown broken off on the left side of Fig. 2.

The embodiment of this invention shown in Figs. 1 and 2, are in slowly rotating engines, or in engines of larger size or working on a two-stroke cycle, provided with the water cooling ribs operating by centrifugal action hereinafter described.

Ignition is effected in any suitable manner but preferably by contacts carried by the cam disk H, or the sleeve I.

If neither of the frictional disks R, S, is in frictional engagement with the drum casing T, then the engine will not transmit any power, and the cylinders and the crank shaft will rotate free in opposite directions at approximately the same speeds, what difference there may be being due to bearing and air resistances. When the crank shaft is retarded by bringing the disk R into contact with the drum casing T, the cylinders are accelerated. The gear wheel N is also retarded with the shaft C, and forms an abutment or fulcrum wheel upon which the bevel pinions P now roll, being driven forward by the gear wheel M which is fixed to the cylinders and which partakes therefore of their acceleration. The power shaft or sleeve I is driven forward at a speed which is half of the difference between the two speeds, i. e. that of the cylinders and that of the shaft C. As the shaft C is further retarded the speed of the power shaft increases until it becomes a maximum when the shaft C is arrested. If it is desired to reverse the car, the disk S connected to the cylinders is retarded, and the power shaft or sleeve is driven in the reverse direction in accordance with the degree of retardation of the disk S.

Referring to Fig. 3 which shows another embodiment of my invention as applied to a two stroke cycle internal combustion engine having two working cylinders, the essential elements although constructed differently are similarly lettered as far as possible. These elements are the cylinders A $A^1$ mounted to rotate on the crank shaft C, the bevel gear wheel M secured to the cylinders A $A^1$, the corresponding bevel gear wheel N secured to the crank shaft C, and the epicyclic or planetary pinions P mounted on the radial pins O, which are carried by and serve to drive the sleeve or power shaft and casing I. In this example however, the means for retarding or arresting one of the elements is shown as a brake band, pulley S² fixed to the cylinders A¹ A² while a similar pulley R¹ is keyed to the crank shaft. The system is mounted on the bearings K² K³, which are in this example shown as ordinary bearings, the bearings K² K³ being supported on the channels L. In this example the pistons are differential, the working portions B⁵ B⁶ being provided with ends of larger diameter B⁷ B⁸. The two pistons on opposite sides of the crank pin C¹ are rigidly held together by the four rods Y Y, two of which only show in the section. The larger diameters B⁷ B⁸ of the pistons reciprocate in the larger diameters A⁹ A¹⁰ of the cylinders, and serve as air pumps to deliver the charges of air and mixture drawn into the annular spaces A¹¹ A¹², and delivered each to the opposite working cylinder. One of the pipes A¹³ is shown on the one side, the corresponding delivery pipe on the other side of the engine is omitted for the sake of clearness. The pipe A¹³ delivers the air and the working charge which is drawn from the outer air and from a carbureter or the like by means of inlet valves of usual and known construction to the annular chamber or pump space A¹², and on the return stroke of the piston B⁷, the air or charge or mixture is delivered to the working cylinder A¹ by the pipe A¹³. The air and mixture are kept separate as far as possible by employing two inlet valves (not shown) the one admitting air only to the pipe A¹³, and the other drawing from a carbureter or the like on the other side of the cylinder to the annular space A¹². Thus the air is delivered to the working cylinders before the mixture.

The same action takes place by means of the pipe (omitted) on the other side of the cylinders from the annular pump chamber A¹¹ to working cylinder A. The ignition is effected in any suitable manner but the contact pieces or the like are preferably carried by the sleeve or casing I.

As shown in Fig. 3, the crank pin C¹ is provided with a bearing W, the inner surface of which embraces and fits the crank pin C¹, and the outer surface of which is flat, the outside of the bearing W being of square section, and adapted to slide laterally between the cross head guides W¹ W² which are rigidly fixed to the pistons B⁷ and B⁸ respectively. It is obvious that a short ordinary connecting rod might be employed connecting one of these pistons, say B⁷ to the crank pin C¹, in the ordinary manner instead of the arrangement shown.

Referring to Figs. 6 and 7, these are elevation and plan of the retarding pulleys R¹ and S² shown in Fig. 3. The brake bands R² and S³ are secured to the portion of the car frame channel L¹ by bolts to the piece of wood or the like shown. The spindle or shaft R³ is suitably mounted in bearings and is adapted to be operated by pedals, so that when given a partial rotation in one direction, it will tighten the bands upon the pulley R¹ and correspondingly loosen them upon the pulley S². If the spindle R³ is turned in the other direction, the bands are tightened on the pulley S² and loosened on the pulley R¹. This is effected by connecting the two ends of each band as shown to opposite rods R⁴ R⁵, which are mounted on cross plates R⁶ fixed to the spindle R³.

In this example Fig. 3, a sprocket wheel is shown fixed to the power sleeve I, for conveying the power from the power sleeve or shaft to a parallel shaft not shown. In other respects, the action of the apparatus for obtaining the variation of speeds is the same as before described.

Instead of the cooling ribs being solid as shown in Figs. 1 and 2, the ribs are in this example formed hollow of sheet metal. This is advisable in this engine working on the two stroke cycle constructed according to this invention, as a greater number of explosions may take place in a given time. This construction obviates the necessity for an extraneous supply of water. The thin sheet metal ribs V are so formed when fitted as a water tight casing or covering over the cylinders A A¹ that a small space is left for water. The water extends into the hollow ribs V and surrounds the cylinders. This is shown more clearly in Fig. 5. The two or more ribbed sheet metal jackets are connected together by a pipe V', which constitutes a common filler pipe for the jackets and is provided with a filler opening V², said filling opening being adapted to be closed by any suitable or conventional form of closure or cap (not shown). When the cylinders rotate the water circulates by centrifugal action, the cooler and denser water moving toward the outer ends of the cylinder jacket V while the hotter and lighter water moves toward the center of the revolving mass, whether the engine has two, four, or more cylinders. The water circulates automatically by centrifugal action. Two pipes as V¹, may be fitted on opposite sides of the cylinders. In Fig. 5 the ribbed jacket is shown with two thin sheet metal casings or walls fitting over the cylinder, but the ribbed outer wall only is essential, as this brings the water in actual contact with the outer surface of the cylinder.

Referring to Fig. 4, this shows diagrammatically a modification in which the epicyclic or planetary bevel gear is inclosed within the rotating cylinder casing, carrying the cylinders A A¹, in this example, the pistons B B¹ are connected to eccentrics W³ W⁴ which are rigidly fixed at 180° apart as to their maximum eccentricities upon the sleeve W⁵. The pistons B B¹ are connected to the eccentrics by the connecting rods D D¹. The gear wheel N is also fixed to the said eccentrics and sleeve. The bevel gear M is fixed to the rotating cylinders A A¹. The radial pins O are fixed in the boss or increased diameter of the power shaft I, and carry the epicyclic pinions P P. The brake band pulley S² is fixed to the cylinders, and the brake band pulley R¹ to the eccentrics sleeve W⁵, which is the equivalent of the crank shaft in the other examples shown. The action of the apparatus by retardation of one of the pulleys is like that before described in giving a variation of speed to the power shaft I. No valves are shown in this example, which may be driven by any suitable fluid pressure.

What I do claim as my invention and desire to secure by Letters Patent is:—

1. In engines a rotatably mounted shaft, cylinders rotatably mounted on the shaft, means for simultaneously rotating the shaft in one direction and the cylinders in the opposite direction, frictional means secured to the cylinders, frictional means secured to the shaft, and non-rotatable means adapted to be brought selectively into frictional contact with the said frictional means on either the said cylinders or shaft in order to vary the speed of rotation.

2. In an engine, a rotatably mounted crank shaft, cylinders rotatably mounted on the crank shaft, means for simultaneously rotating the shaft in one direction and the cylinders in the opposite direction, a friction disk fixed to the cylinders, a friction disk fixed to the shaft, and a member movable axially upon the shaft and adapted to be brought selectively into frictional contact with one or the other of the frictional disks.

3. An engine comprising a shaft mounted in bearings and adapted to rotate in one direction, cylinders mounted on the shaft and adapted to rotate in the opposite direction mechanism co-acting for rotating said shaft and said cylinders in opposite directions, frictional means rotatable with said shaft, frictional means rotatable with said cylinders, and a member adapted to be selectively brought into frictional contact with either of said frictional means.

4. In an engine, a rotatable crank shaft, cylinders rotatably mounted on the shaft, pistons in said cylinders, connected for rotating said shaft in one direction and said cylinders in the opposite direction, a gear wheel carried by said cylinders, a gear wheel carried by said shaft, a power shaft, a gear wheel or wheels carried by said power shaft, which gear meshes with the said gear wheel carried by the said cylinders and with the said gear wheel carried by the shaft, and frictional means for retarding or stopping the rotation of either the shaft or the cylinders.

5. In an internal combustion engine, a rotatably mounted shaft, cylinders rotatably mounted on the shaft, bearings for supporting the shaft and cylinders, the bearings being arranged so that the shaft may rotate in one direction and the cylinders in the opposite direction, a friction clutch member secured to the cylinders, a friction clutch member secured to the shaft, a non-rotatable member mounted between the two clutch members adapted to be selectively brought into frictional contact with either of the friction clutch members for retarding or stopping the same.

6. In an engine, a rotatably mounted crank shaft, cylinders rotatably mounted on the crank shaft, bearings for supporting the shaft and cylinders, the bearings being arranged so that the shaft may rotate in one direction and the cylinders in the opposite direction, a friction clutch member fixed to the cylinders, a friction clutch member fixed to the shaft, frictional means for retarding or arresting one of the two friction clutch members, a transmission shaft, pinions mounted for rotation on said transmission shaft, a gear wheel fixed to the cylinders, a gear wheel fixed to the shaft, each of the said gear wheels meshing with the pinions mounted on the transmission shaft.

7. An engine comprising a rotatable shaft, means rotatable on the shaft for converting fluid pressure into power, said means and the said shaft rotating in opposite directions, a clutch member secured to the shaft, a clutch member secured to said means rotatable on the shaft, means for frictionally retarding or arresting one of the said clutch members, a gear wheel secured to the shaft, a gear wheel secured to the first mentioned power means, a sleeve concentrically mounted on the shaft, a gear wheel meshing with both of said gear wheels for driving the sleeve at progressively varying speeds in either direction.

8. In fluid pressure engines, a rotatable crank shaft, cylinders rotatably mounted on the crank shaft, pistons in the cylinders operatively connected with the crank shaft, said crank shaft and cylinders being adapted to rotate in opposite directions, a friction clutch member secured to the said cylinder, a friction clutch member secured to the crank shaft, a tubular transmission shaft concentrically mounted on the crank shaft, and a differential gearing connecting the transmission shaft with the crank shaft and the cylinders, said differential gearing including a gear wheel secured to the cylinders, a gear wheel secured to the crank shaft, and a gear wheel rotatably mounted on the transmission shaft and meshing with the gear wheels on the crank shaft and cylinders.

9. In an internal combustion engine, a crank shaft, cylinders rotatably mounted on the shaft, pistons in the cylinders, connecting rods co-acting with the pistons for rotating the shaft, and adapted to rotate the cylinders in the opposite direction, a friction clutch member secured to the said cylinders, a friction clutch member secured to the shaft a tubular transmission shaft concentrically mounted on the crank shaft, and a differential gearing connecting the transmission shaft with the crank shaft and the cylinders, said differential gearing including a pinion secured to the crank shaft, a pinion secured to the cylinders, and pinions rotatably mounted on the transmission shaft and meshing with the first mentioned pinions.

10. In an internal combustion engine, a crank shaft, cylinders rotatably mounted on the crank shaft, valves for the cylinders, pistons in the cylinders, connecting rods co-acting with the pistons for rotating the shaft, and adapted to rotate the cylinders in the opposite direction, a friction clutch member secured to the cylinders a friction clutch member secured to the shaft, a tubular transmission shaft concentrically mounted on the crank shaft, a differential gearing connecting the transmission shaft with the crank shaft and the cylinders, and means fixed on said tubular transmission shaft for operating the valves.

11. In an internal combustion engine, a rotatable crank shaft, cylinders rotatably mounted on the shaft, valves for the cylinders, pistons in the cylinders, connected to and rotating the shaft and adapted to rotate the cylinders in the opposite direction, a friction clutch member and a gear wheel secured to said cylinders, a friction clutch member and a gear wheel secured to said shaft, a tubular shaft concentrically mounted on said shaft carrying differential pinions meshing with the gear wheels carried by said cylinders and said shaft, frictional means for retarding or arresting either the cylinders or the shaft whereby the power shaft will transmit the power at a progressive variation of speed in either direction from zero to maximum, and a cam mounted upon and rotating with the said tubular shaft to operate the valves of the engine.

12. In an internal combustion engine, a power shaft element, a second power element comprising cylinders and pistons operatively connected with the said power shaft and rotatable in the opposite direction to the direction of rotation of the power shaft, a rotary driven element, a differential gearing connecting the rotary driven element with both of said power elements, means for retarding the movement of one of said power elements to effect variations in speed of the driven element, valves for the engine cylinders, and valve operating mechanism operatively connected with the said rotary driven element.

13. In an internal combustion engine, a rotatable crank shaft, cylinders rotatably mounted on the shaft, valves for the cylinders, pistons in the cylinders connected to and rotating the shaft and adapted to rotate the cylinders in the opposite direction, a friction clutch member and a gear wheel secured to said cylinders, a friction clutch member and a gear wheel secured to said shaft, a tubular shaft concentrically mounted on said shaft carrying differential pinions meshing with the gear wheels carried by said cylinders and said shaft, frictional means for retarding or arresting either the cylinders or the shaft whereby the power shaft will transmit the power at a progressive variation of speed in either direction from zero to maximum, and means carried by said power shaft for operating the valves.

14. In an engine, a power shaft element, a second power element comprising cylinders and pistons operatively connected with the said power shaft and rotatable in the opposite direction to the direction of rotation of the power shaft, a rotary driven element, a differential gearing connecting the rotary driven element with both of the said power elements, and means for directly retarding or arresting the movement of one of said power elements to effect variations in speed of the driven element.

15. In an engine, a power shaft element, a second power element comprising cylinders and pistons operatively connected with the said shaft and rotatable in the opposite direction to the direction of rotation of the said power shaft, a driven element rotatable in either direction, a differential gearing connecting the driven element with both of said power elements, and means for retarding the movement of the said power elements to effect variations in speed of the driven element in both directions.

16. In an engine, a power shaft element, a second power element comprising cylinders and pistons operatively connected with the said power shaft and rotatable in the opposite direction to the direction of rotation of the power shaft, a rotary driven element, a single differential gearing connecting the rotary driven element with both of said power elements, and means for retarding or arresting the movement of one of said power elements to effect variations in speed of the driven element.

17. In an engine, a power shaft element, a second power element comprising cylinders and pistons operatively connected with the said power shaft and rotatable in the opposite direction to the direction of rotation of the power shaft, a rotary driven element, a differential gearing connecting the rotary driven element with both of the said power elements, and means for retarding the movement of either of said power elements, or arresting the movement of either one of said power elements to effect variations in speed of the driven element.

JAMES DENNIS ROOTS.

Witnesses:
RIPLEY WILSON,
HERBERT D. JAMESON.